US005470908A

United States Patent [19]

Schmidt et al.

[11] Patent Number: 5,470,908
[45] Date of Patent: Nov. 28, 1995

[54] WATER-BASED ACRYLIC COATING COMPOSITIONS

[75] Inventors: Donald L. Schmidt; Robert F. Harris; Charles Coburn, all of Midland, Mich.

[73] Assignee: The Dow Chemical Company, Midland, Mich.

[21] Appl. No.: 144,924

[22] Filed: Oct. 28, 1993

[51] Int. Cl.$^6$ .................. C08J 3/26; C08K 5/32; C08L 27/00
[52] U.S. Cl. .............. 524/520; 524/475; 524/516; 524/522; 525/182; 525/183; 525/199
[58] Field of Search .................. 524/520, 475, 524/516, 522; 525/182, 183, 199

[56] References Cited

U.S. PATENT DOCUMENTS

| | | | |
|---|---|---|---|
| 2,781,383 | 2/1957 | Mannheimer | 260/401 |
| 2,921,960 | 1/1960 | Kirstahler et al. | 260/534 |
| 4,177,178 | 12/1979 | Das et al. | 260/29.40 A |
| 4,214,102 | 7/1980 | Leenders | 562/564 |
| 4,239,635 | 12/1980 | Rieder | 252/34 |
| 4,250,183 | 2/1981 | Krastinat | 424/263 |
| 4,285,849 | 8/1981 | Dowbenko et al. | 260/29.6 N R |
| 4,344,993 | 8/1982 | Schmidt et al. | 428/35 |
| 4,424,239 | 1/1984 | Nota et al. | 427/388.3 |
| 4,469,836 | 9/1984 | Schmidt et al. | 524/376 |
| 4,552,678 | 11/1985 | Carginino et al. | 252/49.3 |
| 4,554,325 | 11/1985 | Schmidt et al. | 525/326.8 |
| 4,588,643 | 5/1986 | Schmidt et al. | 428/422 |
| 4,592,930 | 6/1986 | Schmidt et al. | 427/133 |
| 4,602,058 | 7/1986 | Graham et al. | 524/320 |
| 4,696,965 | 9/1987 | Rasmussen | 524/380 |
| 4,705,889 | 11/1987 | Hendricks et al. | 562/564 |
| 4,764,291 | 8/1988 | Steltenkamp et al. | 252/8.8 |
| 4,764,564 | 8/1988 | Schmidt et al. | 525/328.2 |
| 4,769,285 | 9/1988 | Rasmussen | 428/355 |
| 4,837,290 | 6/1989 | Rasmussen et al. | 526/304 |
| 4,929,666 | 5/1990 | Schmidt et al. | 524/516 |
| 5,006,624 | 4/1991 | Schmidt et al. | 526/243 |
| 5,045,615 | 9/1991 | Heilmann et al. | 526/245 |
| 5,055,544 | 10/1991 | Harris et al. | 528/59 |

OTHER PUBLICATIONS

ASTM Designation: D 4060–90, Standard Test Method for Abrasion Resistance of Organic Coatings by the Taber Abraser, pp. 559–561.
ASTM Designation: D 2794–92, Standard Test Method for Resistance of Organic Coatings to the Effects of Rapid Deeformation (Impact), pp. 394–395.
Lysaght, Vincent E., ASTM Bulletin, "The Knoop Indenter as Applied to Testing Nonmetallic Materials Ranging from Plastics to Diamonds", Jan. 1946, pp. 39–43.
Derwent Publications, 86–024322/04, Japan.
Derwent Publications, 66627 E/32, Japan.
U. S. Patent Application Serial No. 08/144,752, filed Oct. 28, 1993.

*Primary Examiner*—Paul R. Michl
*Assistant Examiner*—U. K. Rajguru
*Attorney, Agent, or Firm*—Ann K. Galbraith

[57] ABSTRACT

Described herein is a composition comprising at least 10 percent by weight of water and, based on the weight of components (a), (b), and (c); (a) 0 to about 95 percent by weight of a water-compatible polymer having at least two pendant carboxylate groups; (b) 1 to about 60 percent by weight of a polymeric polycarboxylate polymer different from (a) having (1) at least two pendant carboxylate groups and (2) at least one internal amide, thioamide, urea, thiourea, biuret, dithiobiuret, or urethane group; and (c) 2 to about 70 percent by weight of a polyfunctional crosslinking agent having an ionic or potentially ionic moiety counter ion capable of reacting with the carboxylate groups of (a) and (b). Component (b) may also contain fluoroalkyl groups. The composition of the invention provides a water-based coating which, when deposited on a surface to be coated and allowed to dry and form a crosslinked polymer, has a high degree of wear resistance, hardness, and impact resistance.

20 Claims, No Drawings

WATER-BASED ACRYLIC COATING COMPOSITIONS

BACKGROUND OF THE INVENTION

This invention relates to polymeric coating compositions containing water-compatible polymers, including coating compositions wherein such polymers contain at least one fluoroalkyl group.

Because of their resistance to sun and weather, coatings derived from methacrylate monomers are widely used for outdoor applications such as automobile finishes. Unfortunately, these coatings often do not have the desired physical properties. Additionally, many of the acrylate-type coatings require flammable and/or environmentally unfriendly application solvents. Because of its low toxicity and flammability, water is a desirable solvent for coating formulations. It is therefore highly desirable to provide a water-based coating system with improved physical properties such as toughness and adhesion to substrates.

U.S. Pat. Nos. 4,592,933; 4,764,564; 4,467,836; and 4,554,325 teach the preparation of coatings using reactive polymeric surfactants and crosslinking agents. U.S. Pat. Nos. 4,929,666 and 5,006,624 teach the preparation of coatings using water-compatible crosslinkable polymeric surfactants with crosslinking agents. Such coating compositions are water-based, and have a sufficiently low surface tension to enable the composition to form a uniform, thin film when deposited on a surface to be coated, yet also have good adhesion to the surface itself. However, it would be desirable to further improve the adhesion, wear resistance, and toughness of such coatings for certain coating applications.

SUMMARY OF THE INVENTION

In one aspect, this invention is a composition comprising at least 10 percent by weight of water and, based on the weight of components (a), (b), and (c);

(a) 0 to about 95 percent by weight of a water-compatible polymer having at least two pendant carboxylate groups;

(b) 1 to about 60 percent by weight of a polymeric polycarboxylate different from component (a), which has (1) at least two pendant or terminal carboxylate groups and (2) at least one internal amide, thioamide, urea, thiourea, biuret, dithiobiuret, or urethane group; and (c) 2 to about 70 percent by weight of a polyfunctional crosslinking agent having at least two ionic or potentially ionic moiety counter ions capable of reacting with the carboxylate groups of (a) and (b).

In a second aspect, this invention is a composition as in the first aspect of the invention, wherein component (a) contains at least one pendant fluoroalkyl moiety.

It has been discovered that the composition of the invention provides a water-based coating which, when deposited on a surface to be coated and allowed to dry and form a crosslinked polymer, has a high degree of wear resistance, hardness, and toughness, as may be measured by the testing procedures set forth below. Further, these coatings may be characterized by a high degree of toughness and adhesion of the cured coating to a substrate. Advantageously, the ionic groups present in the composition undergo reaction which substantially destroys the charge with subsequent formation of covalent crosslinks. These and other advantages of the invention are apparent from the following description of the invention.

DETAILED DESCRIPTION OF THE INVENTION

Suitable water-compatible polymers for use as component (a) of the composition of the invention include any such polymer having at least two pendant carboxyl groups converted to their salt form. Enough of the carboxyl groups should be converted to their salt form to make the polymer water-compatible, but it may not be necessary to convert all of the pendant carboxyl groups. Such polymers are preferably prepared from unsaturated (e.g., vinyl) monomers by conventional addition polymerization methods, so long as at least one of the monomers contains pendant carboxyl groups. These polymers, component (a), may be represented by the following formula:

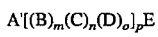

A' and E are terminal groups formed from the polymerization reaction employed; and B, C, and D are internal covalently bonded groups which can be arranged in any sequence to form a block or random polymer. In the first aspect of the invention, the subscript m is zero; in the second aspect of the invention, the subscript m is a positive integer, so that the resulting polymer will contain a pendant fluoroalkyl group. The subscript n is a positive integer; the subscript o is a non-negative integer; and the subscript p represents the average degree of polymerization. Typically, the polymer can have a number average molecular weight between 2,000 and 200,000, preferably between about 8,000 to 50,000.

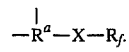

$R^a$ is a saturated trivalent aliphatic radical containing from 2 to 4 carbon atoms. The B group is derived from polymerization of an ethylenically unsaturated monomer containing a pendant fluoroalkyl group. X is a covalently bonded connecting group. $R_f$ is a pendant fluoroalkyl moiety containing from 2 to 12 carbon atoms.

In Formula I, C is

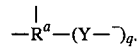

$R^a$ is as previously defined. Y is a covalently bonded connecting group attached to a reactive moiety, , which charge is an anionic moiety and may have a counter ion; q is 1 or 2. For example, the counter ion may be $H^+$ or $NH_4^+$, or a protonated amine. In the presence of a crosslinking agent the counter ion may be bound to such agent. Examples of connecting groups X and Y are shown in U.S. Pat. No. 4,929,666, the relevant portions of which are hereby incorporated by reference.

In Formula I, D is derived from a non-interfering, hydrocarbon-based polymerizable monomer. For example, monomers of the following formula may be used:

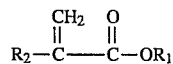

wherein $R_1$ is an alkyl from 1 to 36 carbon atoms, more preferably an alkyl of from 1 to 12 carbon atoms; —$CH_2$—CH=$CH_2$, or

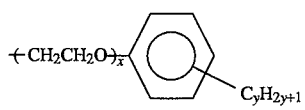

wherein x is an integer of from 1 to about 20, y is an integer from 1 to about 18, and $R_2$ is hydrogen or methyl.

Another example of a suitable monomer corresponds to the formula:

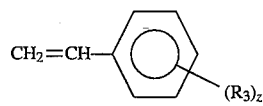

wherein $R_3$ is independently in each occurrence H, or a $C_{1-12}$ alkyl group, and z is a number from 0 to 5.

Some examples of the polymers containing fluoroalkyl groups, including methods for their preparation, are described in U.S. Pat. Nos. 5,006,624 and 4,929,666 (the relevant parts of which are hereby incorporated by reference). As an example, such polymers may be prepared by polymerizing acrylic or methacrylic esters with an ethylenically unsaturated carboxylic acid, and then contacting the resulting polymer with a suitable base under conditions sufficient to convert at least one carboxyl group on the polymer to its salt form. Suitable acrylic or methacrylic esters include, for example, methyl methacrylate, n-butyl methacrylate, lauryl methacrylate, and 2-N-ethylperfluorooctane sulfonamido ethylacrylate. When m=0, useful non-fluoroalkyl polymers are prepared.

Suitable ethylenically unsaturated carboxylic acids which may be used to prepare the water-compatible polymer of component (a) include any carboxylic acid with at least one additional polymerizable —C=C— group and at least one pendant carboxyl group. Examples of such acids include methacrylic acid, β-carboxyethyl acrylate (β-CEA), acrylic acid, cis-aconitic acid, trans-aconitic acid, or itaconic acid. Preferably, the carboxylic acid is β-carboxyethyl acrylate.

In the second aspect of the invention, suitable water-compatible polymers for use as component (a) include polymers as described above, which also have at least one pendant fluoroalkyl moiety. Preferably, the fluoroalkyl moiety is a $C_6$-$C_9$ fluoroalkyl group containing at least three fully fluorinated carbon atoms, including a terminal —$CF_3$ group. The group may be linear, branched, or if sufficiently large, cyclic. In addition, the fluoroalkyl group may be connected to the vinyl group of the monomer through particular connecting groups selected to enhance the chemical and thermal stability of the fluoroalkyl group. Examples of such fluoroalkyl groups include $R_f$—$SO_2$—N(R)—$(CH_2)_n$—, $R_f$—$(CH_2)_n$—, $R_f$—$(CH_2)_n$—S—$(CH_2)_n$—, or $R_f$—$(CH_2)_n$—C(OH)(R)—$(CH_2)$—, wherein $R_f$ is a fluoroalkyl group, R is H or a $C_{1-12}$ alkyl group, and n is a whole number from 1 to 10.

The vinyl polymerization reaction to prepare component (a) may be carried out by conventional polymerization methods. Following the polymerization reaction, the polymer is contacted with a base under conditions sufficient to convert a sufficient number of the carboxyl groups of the polymer to a carboxylate salt in order to make the polymer compatible with the reaction solvent. Examples of suitable bases include ammonium hydroxide, triethylamine, triethanolamine, and tetraalkylammonium hydroxide. A base which provides a fugative cation, such as $NH_4OH$, is preferred.

Component (a) is preferably present in an amount, based on the weight of components (a), (b), and (c) of the composition, of at least about 10 percent, more preferably at least about 30 percent, most preferably at least about 60 percent; and is preferably no greater than about 90 percent, more preferably no greater than about 80 percent, and is most preferably no greater than about 70 percent.

The term "water-compatible" as used herein refers to a stable or metastable (temporarily stable) mixture of the coating composition with water, including a solution, micellular, or partially colloidal suspension, or a latex. The composition of the invention may optionally contain an organic solvent, in an amount of up to 70 percent by weight of the total water/organic solvent combination. Preferably, however, the total water/organic solvent comprises less than 50 percent by weight organic solvent. Preferably, the organic solvent is water-compatible. Suitable water-compatible solvents include lower alkanols and alkylene glycols. In addition, the composition of the invention may optionally contain plasticizers, extenders, and additives such as surfactants, rheology modifying agents, dyes, and pigments.

Component (b) of the composition of the invention is a water-compatible polymeric polycarboxylate different from the polymer used as component (a), and which is a polymer having (1) at least two pendant carboxylate groups and (2) at least one internal amide, thioamide, urea, thiourea, biuret, dithiobiuret, or urethane group in its backbone. Preferably, the polycarboxylate contains at least one internal amide group. Preferably, the polymeric polycarboxylate is water-compatible to at least 5 g per 100 g of water, more preferably to 10 g per 100 g of water. Component (b) is preferably present in an amount, based on the weight of components (a), (b), and (c) of the composition, of at least about 1 percent, more preferably at least about 5 percent, most preferably at least about 10 percent; and is preferably no greater than about 50 percent, more preferably no greater than about 20 percent, and is most preferably no greater than about 10 percent. When the composition of the invention is used as a coating composition, the polymeric polycarboxylate (component (b)) is preferably employed in an amount sufficient to improve the average hardness, toughness, and/or wear resistance of the coating composition.

Polymeric polycarboxylates (component (b)) containing internal amide, thioamide, urea, thiourea, biuret, dithiobiuret, or urethane groups may be prepared as described in copending application by Robert F. Harris et al., entitled "Carboxylic Acid-Functional and Hydroxyalkylamide-Functional Polyethers Containing Urea, Thiourea, Biuret, Dithiobiuret, Amide Thioamide and/or Urethane Moieties in their Backbone", filed Oct. 28, 1993, U.S. patent application Ser. No. 08/144,752. Such polycarboxylates are referred to in the copending application as carboxylic acid-functional polyethers which have been converted to their salt form.

Polyamines suitable for use in preparing the polymeric polycarboxylates (component (b)) include any polyamine or mixture of polyamines which will produce a water-compatible polymeric polycarboxylate when reacted with a polycarboxylic acid and converted to the corresponding salt. Polyalkyleneoxy polyamines are preferred for this purpose, but other polyamines which are less water-soluble, such as aliphatic polyamines, may be used in conjunction with polyalkyleneoxy polyamines, so long as the resulting polycarboxylic acid containing at least one amide, thioamide, urea, thiourea, biuret, dithiobiuret, or urethane group is water-compatible.

Polyalkyleneoxy polyamines useful in preparing water-soluble polymeric polycarboxylic acids are well-known compositions which may be prepared by the reductive amination of polyalkyleneoxy polyols using hydrogen and ammonia in the presence of a catalyst. This reductive amination of polyols is described in U.S. Pat. Nos. 3,128, 311; 3,152,998; 3,236,895; 3,347,926; 3,654,370; 4,014,933 and 4,153,581, the relevant portions of which are incorporated herein by reference. The molecular weight of the polyalkyleneoxy polyamine starting material, when employed, is preferably in the range of from about 200 to about 4,000.

Polycarboxylic acids suitable for preparing the polymeric polycarboxylate include any aliphatic or aromatic polycarboxylic acid having at least two pendant carboxyl groups. Examples of such polycarboxylic acids include succinic, glutaric, adipic, sebacic, cyclohexane-1,4-dicarboxylic, phthalic, and terephthalic acids. Preferably, the carboxylic acid is a $C_{2-8}$ aliphatic dicarboxylic acid because the salts thereof are more easily solubilized in water. In addition dimers and trimers of such acids may also be used.

The polymeric polycarboxylate polymer used as component (b) of the composition of the invention preferably has at least 2 internal amide groups per molecule and a molecular weight in the range of from about 300 to about 5,000. The molecular weight of the polymeric polycarboxylate polymer may be controlled by choice of starting materials with particular molecular weights and/or by choice of the stoichiometry of the reactants used to prepare the polymeric polycarboxylate (component (b)) polymer (since higher molecular weight polymeric polycarboxylates will be obtained as the reaction stoichiometry approaches 1:1). The number of amide, urea, and urethane groups per molecule may also be controlled in a like manner. Preferably, the ratio of carboxyl groups to amine groups in the reaction mixture is in the range of from about 2:1 to about 1.1:1.

The polymeric polycarboxylic acid may be converted to a salt by contacting it with a suitable base, such as lower alkyl amines, alkanol amines, and ammonium hydroxide. Preferably, the base is ammonium hydroxide.

The molecular weight of the polymeric polycarboxylates (component (b)) may be determined by titration of the end groups with a standard base, such as sodium hydroxide or potassium hydroxide. The existence of amide, urea, and/or urethane groups in the backbone of the polymeric polycarboxylic acid can be determined by carbon-13 NMR.

The polymeric polycarboxylates (component (b)) can be employed as part of an unpurified reaction product, or the final reaction mixture can be purified to remove unreacted starting materials. Basic impurities such as unreacted amines may be removed by contacting the reaction product with acidic ion exchange resins. Other impurities, particularly color bodies, may be removed from the reaction product by contacting it with an adsorbant solid, such as activated charcoal. Solvents may also be used to purify the reaction product.

Suitable polyfunctional crosslinking agents for use as component (c) of the compositions of the invention include any compound or polymer having at least two reactive cationic or potentially cationic pendant ions. The cation may be a polyfunctional cation such as benzylsulfonium, aryl cyclic sulfonium (such as described in U.S. Pat. No. 3,903, 056) or azetidinium as the $CO_3=$ or $HCO_3-$ salt. Preferred potentially cationic crosslinking agents include polyfunctional oxazolines or oxazines. Components (a) and (b) of the composition of the invention are usually employed in the form of an ammonium salt. Thus, when the solvent is removed, $NH_3$ is evolved and the resulting carboxy acid functionality reacts with the crosslinking agent to form covalent bonds. Most preferably, the crosslinking agent is poly-(2-isopropenyl-2-oxazoline) or a copolymer of 2-isopropenyl-2-oxazoline and methyl methacrylate.

The crosslinking agent is preferably present in an amount, based on the weight of components (a), (b), and (c) of the composition, of at least about 5 percent, more preferably at least about 10 percent, most preferably at least about 20 percent; and is preferably no greater than about 50 percent, more preferably no greater than about 45 percent, and is most preferably no greater than about 30 percent. Preferably, the overall ratio of carboxylate:oxazoline groups in the composition is at least about 0.2:1, more preferably at least about 0.7:1, and is preferably no greater than about 4:1, more preferably no greater than about 1.4:1, and is most preferably about 1:1.

Components (a), (b), and (c) may be combined with water in any suitable manner to form a water-based coating composition. The coating thereafter may be applied to a substrate to be coated in any convenient manner, such as by roller coating or spraying, and allowed to cure. The coating is preferably cured at a temperature in the range of from about 30° C. to about 150° C., more preferably in the range of from about 100° C. to about 120° C. The coating may also be cured at ambient temperatures, although the rate of curing will be slower at such temperatures.

The coating composition may optionally contain other additives, such as pigments, anti-sag agents, leveling agents, and curing promoters. The coating preferably contains a leveling agent such as Fluororad™ FC-29, available from 3M. When employed, the leveling agent is preferably used in an amount in the range of from about 10 ppm to about 1000 ppm, based on the weight of the total formulation.

The wear resistance, hardness, and impact resistance of the coatings may be measured by ASTM 4060 ("Abrasion Resistance of Organic Coatings by the Taber Abraser"); ASTM 138 ("The Knoop Indenter as Applied to Testing Nonmetallic Materials Ranging from Plastics to Diamonds") (ASTM Bulletin, January 1946); and ASTM 2795 ("Resistance of Organic Coatings to the Effect of Rapid Deformation (Impact)"), respectively.

ILLUSTRATIVE EMBODIMENTS

The following examples are given to illustrate the invention and should not be interpreted as limiting it in any way. Unless stated otherwise, all parts and percentages are given by weight.

Starting Material A

Preparation of a Polymer Containing no Fluoroalkyl Groups (m=0) (Component (a))

A terpolymer having a monomer ratio of methacrylic acid (MAA): methyl methacrylate (MMA): and n-butyl methacrylate (BMA) of 20:60:20 is prepared. Polymerization is carried out under a nitrogen atmosphere in a 250 mL 3-necked flask equipped with a mechanical stirrer, condenser, and two addition funnels. The flask containing 90 g of t-butanol is heated to 80° C. and 20 g MAA, 60 g MMA, 20 g BMA and 10 g t-butanol is introduced by the first addition funnel at increments of 10 mL every five minutes. Simultaneously, 1.6 g of Vazo™ 64 (DuPont) in 10 g of methyl ethyl ketone is added at a constant rate such that both addition funnels are emptied at the same time. Three hours after the last addition, the reaction is cooled, 25 mL of concentrated ammonium hydroxide in 800 mL water is added. After removing the t-butanol under reduced pressure, the solution is dialyzed using a Spectrapor™ membrane tubing (Spectrum Medical Industries) with a 12,000 to 14,000 molecular weight cutoff. This yielded 573 g of a 6.06 weight percent solution of polymer.

Starting Material B

Preparation of a Polymer Containing Fluoroalkyl Groups (m>0) (Component (a))

Preparation of Anionic Polymeric Surfactants

A perfluorocarbon-containing polymeric surfactant is prepared having a pendant carboxylate functionality. Polymerization is carried out in a 250 mL, 3-necked, round bottomed-flask equipped with an overhead stirrer, condenser, two pressure equalizing addition funnels and a nitrogen inlet. The reaction flask is charged with 25 g of MEK, stirred, heated to 85° C., and purged with nitrogen. To the funnel is added 40 g of a perfluorinated methacrylate compound (Zonyl TM™, made by DuPont, after inhibitor removal) and 10 g of methacrylic acid (MAA) along with 5 g additional MEK. The mixture of monomers is added to the reaction flask at the rate of 3.5 mL per 15 minutes. 1.2 Grams of initiator (Vazo-64™, α,α-azobisisobutyronitrile, manufactured by DuPont) in 12 mL of MEK is added at the rate of 1 mL per 15 minutes to the reaction mixture. After the additions are completed, the reaction mixture is held at 85° C. for three hours. The reaction mixture is allowed to cool to ambient temperature and the solvent removed under vacuum leaving a white powder form of a polymer having pendant perfluoroalkyl groups and pendant carboxy functionalities. The solid powder is dissolved into an aqueous ammonium hydroxide solution. The residual ammonium hydroxide is removed under vacuum and the polymer dialyzed utilizing Spectrapor™ dialysis tubing with a molecular weight cutoff of 8,000.

Starting Material C

Preparation of a Polymeric Polycarboxylate Containing Internal Amide Groups (Component (b)).

Jeffamine™ D-400 (178.13 g, 0.3699 mol, an aminated poly(propylene glycol) manufactured by Texaco) and adipic acid (71.86 g; 0.4920 mol) are combined in a 500 mL, 3-necked flask equipped with a temperature controller, overhead stirrer, thermometer and a condenser connected to a Dean Stark moisture trap. The system is flushed with $N_2$ and maintained under an $N_2$ blanket. The contents of the reactor are then heated to 150° C. to form the corresponding amine salt. Cumene (200 mL) is then added and the system is heated at reflux while removing the cumene-water azeotropic mixture in the Dean Stark trap. After 18 hours at reflux, the condenser and Dean Stark trap are removed and the system is evacuated to 2 mm Hg and maintained at this reduced pressure and 160° C. for 5 hours while cumene is collected in a –78° C. trap. After cooling to ambient temperature under $N_2$, the crude product is dissolved in methanol (200 mL) and stirred overnight with Dowex™ 50W ion exchange resin (20 g) to adsorb any amino compounds. The methanol solution is then filtered to remove resin beads and stripped on a rotary evaporator to remove the methanol. The product is obtained as a viscous, amber liquid: 0.490 meq/g by titration with 0.100N NaOH dissolved in methylene chloride and further purified by extracting with dilute (0.1N) HCl, washing with water, and drying over anhydrous sodium sulfate. After filtration, the product is recovered by stripping the methylene chloride under vacuum. Carbon-13 NMR ($CDCl_3$) shows amide carbonyl moieties and carboxylic acid carbonyl moieties. The product is dissolved in propylene glycol to give a 41.8 weight percent active solution.

Starting Material D

Preparation of Poly(2-Isopropenyl-2-Oxazoline) Crosslinking Agent (Component (c))

IPO/MMA Copolymer (IPO Polymer)

The IPO monomer (2-isopropenyl-2-oxazoline) is freshly distilled (46° C. to 50° C. about 5 mm Hg) immediately prior to the polymerization step. The inhibitor-free monomer (260 mL) is added to a mixture of methyl methacrylate (73.5 mL), isopropanol (87.5 mL), distilled water (400 mL) and tert-butanol (400 mL). A portion of this solution (250 mL) is added to the reaction vessel and the mixture is warmed to 50° C. while the solution of the initiators (Formopon™ a 98/2 mixture of sodium formaldehyde sulfoxylate and sodium carbonate, available from Henkel Corporation) (8.8 g in 30 mL of water) and a 70 percent aqueous solution of tert-butyl hydroperoxide (9.82 g in 30 mL of tert-butanol) are added to 125 mL addition funnels. The initiators are slowly added at a rate of 5 mL/hr while the monomer solution is added at a rate of 400 mL/hr.

At the end of 10 hours the heating is discontinued, the system is opened to the atmosphere and the polymerization is quenched by the addition of isopropanol (200 mL). The percent solids of the solution is determined by removing a known amount of the solution from the reaction mixture, removal of volatile components under reduced pressure, and then reweighing the sample. From this value the percent conversion of the polymerization reaction could be calculated. Generally this value is between 70 and 80 percent.

The reaction mixture is subjected to reduced pressure to remove residual solvents and monomers (the original volume is maintained through the addition of water). This solution is poured into Spectrapor™ dialysis tubing (3500 MW cutoff). The tubes are sealed, placed into one gallon jars and stirred with strong acid ion exchange resin. The water in the jars is periodically changed until its conductivity remained nearly constant. The dialysis tubing is air dried to partially concentrate the polymer solution. The contents of the dialysis tubings are combined, filtered, analyzed for residual monomers, stabilized by the addition of concentrated ammonia (pH of about 8) and stored at 45° F. until needed.

EXAMPLE 1

Coating Formulation Containing Polymer with No Pendant Fluoroalkyl Groups and Polymeric Polycarboxylate Ammonium hydroxide (Fisher Chemical, 28 to 30 percent assay $NH_3$ weight percent) 0.50 g in 10 g of water is mixed with 10 g of (41.8 weight percent propylene glycol solution of the polymeric polycarboxylate described above as Starting Material C). This solution is mixed with 43.5 g (19.2 weight percent) of an aqueous solution of the ammonium salt of a polymer prepared from a 60:20:20 weight ratio of methyl methacrylate, butyl methacrylate and methacrylic acid described as Starting Material A. The latter solution is added to 31.52 g (9.85 weight percent) aqueous solution of an 80:20 weight ratio copolymer of 2-isopropenyl-2-oxazoline and methyl methacrylate (Starting Material D).

A 7 percent formulation is prepared by dilution with 142.2 g of solvent containing 76.6 percent, 9.9 percent, 13.5 percent (weight percent) water, 2-propanol and propylene glycol, respectively.

Comparative Example

Acrylate Formulation without Polymeric Polycarboxylate (component (b)) (Comparative Example—not an Example of this Invention)

The ammonium salt of a polymer is prepared from methyl methacrylate, butyl methacrylate, methacrylic acid (Starting Material A) which are used in a 60:20:20 weight percent ratio. 40 g of the solution containing the polymer (19.2 weight percent, in water) is mixed with 25.5 g of a 9.85 percent weight aqueous solution of an 80:20 weight percent ratio of 2-isopropenyl-2-oxazoline and methyl methacrylate (Starting Material D). A coating formulation is prepared by dilution with 80.1 g of a solvent containing 76.6 percent, 9.9 percent, 13.5 percent (weight) water, 2-propanol and propylene glycol, respectively.

Comparison of Coatings with and without Polymeric Polycarboxylate (Component (b)).

Both coating formulations are applied to glass microscope slides and mild steel and cured in an oven at 130° C. for 30 minutes. The clear coatings are tested for adhesion by scratching a grid or cross-hatch pattern with a steel scribe. The coating containing the polymeric polycarboxylate could not be removed by Scotch™ transparent tape, however, parts of the film that did not contain polymeric polycarboxylate (Starting Material C) came off when the adhesive tape was removed.

EXAMPLE 2

Coating Formulation Containing a Polymer with Pendant Fluoroalkyl Groups and a Polymeric Polycarboxylate (o=0 for Component a)

A coating formulation is prepared from a carboxylate functional fluoroalkyl polymer prepared from a 60:40 weight percent composition of Zonyl™ (DuPont) and Sipomer™ B-CEA (available from Alcolac) and a crosslinking copolymer consisting of an 80:20 weight percent ratio of 2-isopropenyl-2-oxazoline (IPO) and methyl methacrylate (MMA) (Starting Material D). The two polymers are combined in the presence of $NH_4OH$ in a 4:7.2 ratio such that the equivalents of oxazoline functionality are essentially equal to the carboxylate equivalent present in the fluoroalkyl polymer. The formulation is 8.76 percent active and the solvent consists of a 67:13:20 weight ratio of water, ethylene glycol and 2-propanol.

Addition of Polymeric Polycarboxylate (Component (b))

A solution containing 0.0718 g of the ammonium salt of a polymeric polycarboxylate with an equivalent weight of about 1550, prepared from Jeffamine™ D-400 and adipic acid, and 0.0157 g of the above IPO/MMA copolymer in a solvent consisting of 33.3:49.8:33 weight ratio of water, propylene glycol and 2-propanol, respectively, is added to 10 g of the fluoroalkyl formulation.

Both the modified and unmodified formulations are cast on microscope slides and a piece of Armstrong™ floor tile. After curing for 30 minutes at 130° C. the coatings prepared from the modified formulations had the best adhesion via the previously described cross hatch test.

EXAMPLE 3

Preparation of 60:10:30 (Weight Ratio) terpolymer of FX- 13 (2-N-ethylperfluorooctanesulfonamido) ethyl acrylate/lauryl methacrylate/B-CEA (Beta-carboxyethyl acrylate), and Surfactant Therefrom. (Component (a); m>0).

The terpolymer is prepared under nitrogen by using syringe pumps (Sage Model 352, Orian Research Inc.) to simultaneously-continuously add four solutions to an 82° C., stirred, initiator solution 1.13 g, Vazo™-67 (DuPont), 30 g methylethyl ketone (MEK), 20 g propylene glycol. The four solutions: (1) FX-13 (30.0 g) (available from 3M), lauryl methacrylate (5.0 g), 15 g MEK; (2) β-CEA (15.0 g), 10 g MEK, (3) Vazo™-67 (1.13 g), 8 g MEK and (4) mercaptoethanol (0.04 g), 8 g MEK are added over a three-hour period.

The polymer solution is mixed with 100 g water and 2.5 g ammonium hydroxide (28% $NH_3$). The stirred solution is warmed to 50° C. and exposed to a stream of nitrogen to remove MEK and excess $NH_4OH$. After dialysis against distilled water (Spectrapor™ membrane tubing M.W. cutoff 6000 to 8000) for 72 hours, the solution is centrifuged (Model CM Centrifuge from International Centrifuge) and concentrated under a stream of nitrogen to 16.3 weight percent solids.

Coating Formulation Containing Water-Compatible Polymer, Poly(IPO/MMA) Crosslinker and Polymeric Polycarboxylate.

The aqueous terpolymeric surfactant solution described above (7.46 g, 16.3 weight percent solids, 0.00214 molar equiv. carboxylate) is combined with: (1) Polymeric Polycarboxylate (Starting Material C) (0.60 g, 20.0 weight percent solids in ethylene glycol, 0.00003 molar equiv. carboxylate), (2) poly-(IPO/MMA) (3.04 g, 9.85 weight percent aqueous 0.00127 molar equiv. oxazoline, and (3) 2.5 g ethylene glycol and 2.0 g 2-propanol.

Comparison of Coatings with and without Added Polymeric Polycarboxylate

The above formulation containing the polymeric polycarboxylate and a similar formulation containing all the ingredients except the polymeric polycarboxylate and its molar equivalent of the IPO/MMA copolymer are both cast with a number 46 wire wound rod onto 1/32 inch mild steel panels. The coatings are cured at 130° C. for one hour which produced films with a thickness of about 0.0006 inch. The film adhesion is evaluated by scratching a grid or cross-hatch pattern with a steel scribe. The coating containing the polymeric polycarboxylate could not be removed by 3M Scotch™ transparent tape 600. The unmodified coating could be completely removed. Impact resistance is determined with a Gardner Impact tester. The modified coating had a direct impact resistance (ASTM 2795) of 20 in./lb. The unmodified coating had an impact resistance of only 4 in./lb. In addition, markings applied with a black permanent marker (Stanford-Sharpe™) could easily be wiped off both coatings with tissue paper.

EXAMPLE 4

A polymeric polycarboxylate is prepared as follows:
Preparation of a Polymeric Polycarboxylate Based on Jeffamine™ D-400 and Sebacic Acid; Acid:Amine Molar Ratio=1.25; Molecular Weight=3127.

Jeffamine™ D-400 (188.39 g; 0.4126 mol, MW=456.6) and sebacic acid (104.31 g; 0.5157 mol) are combined in the same reaction set up used in the preparation of Starting Material C. The system is flushed with $N_2$ and maintained under an $N_2$ blanket. The contents of the reactor are heated to 150° C. at atmospheric pressure to form the corresponding amine salt. The system is then evacuated to 2 mm Hg and maintained at this reduced pressure and 150° C. for 5 hours while the by-product water from amide formation is collected in the −78° C. trap. After cooling to ambient temperature under $N_2$, the crude product is dissolved in methanol (200 mL) and stirred overnight with Dowex™ 50W ion exchange resin (available from The Dow Chemical Company) to adsorb any amino compounds. The methanol solution is then filtered to remove resin beads and stripped on a rotary evaporator to remove the methanol. The product is obtained as a viscous, amber liquid: Brookfield viscosity, >2,000,000 cps at 24° C.; 0.6396 meq/g by titration with 0.1N NaOH; molecular weight is 3127 by end group titration (10.3 amide moieties/average molecule). Carbon-13 NMR ($CDCl_3$) shows amide moieties and carboxylic acid moieties.

A portion of the above product is neutralized with ammonium hydroxide to a pH of about 9 and additional water is added to give the corresponding ammonium salt at about 5 percent solids. Carbon-13 NMR (DMSO-$d_6$) shows amide carbonyl moieties and carboxylate anion carbonyl moieties.

Preparation of β-CEA Terpolymer

| β-CEA Terpolymer | | | |
|---|---|---|---|
| Component | mol % | wt % | Amount |
| β-Carboxyethyl Acrylate* | 27.7 | 33.5 | 25.1 g |
| Methyl Methacrylate | 59.5 | 46.5 | 34.9 g |
| n-Butyl Methacrylate | 16.8 | 20.0 | 15.0 g |
| VAZO 64 (1.0 g in 10 ml MEK) | | | 11.0 ml |
| Tertiary Butanol | | | 75.0 g |

*Alcolac SIPOMER™ β-CEA available from Alcolac.

The terpolymer is made in a 250-mL, 3-necked round-bottomed flask equipped with condenser, claisen adapter, thermometer, two addition funnels, nitrogen sparger and temperature controller. The monomers and t-butanol (25 g) are placed in one of the addition funnels, the VAZO™-64 is placed in a second funnel and t-butanol (50 g) is charged to the reactor. The reactor is heated to 82° C., sparged with $N_2$ and maintained at 82° C. during monomer addition. The initiator solution is added at 1 mL/5 min and the monomer feed is added at 8 mL/5 min. After addition is complete, the reactor is heated for 2.5 additional hours at 82° C., cooled to ambient temperature and cleared by the addition of a small amount of water. Concentrated ammonium hydroxide (25 ml, 15N) and water (600 mL) are added and the volatiles are stripped on a rotary evaporator. The clear solution is dialyzed (12,000 to 14,000 molecular weight cutoff) to give a polymer solution at 5.50 percent solids containing 51.4 g polymer.

Coating Preparation

The following formulation was prepared in a 10 mL bottle. Each component is added in the order given below. The IPO Polymer is prepared as described above for Starting Material D.

| Coating Formulation | | |
|---|---|---|
| Polymeric Polycarboxylate | 0.98 g | 0.25 meq $CO_2^\ominus$ |
| β-CEA Terpolymer | 2.21 g | 1.25 meq $CO_2^\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | >1 g | |
| FC-129 (1% in water) | 0.22 g | |
| Ethylene Glycol | 1.10 g | |

A portion of the solution is cast on a panel of cold rolled steel (previously wiped with a 1 percent solution of a silane compound in methanol (Z-6020, available from Dow Corning Corp.)) and is drawn down using a #46 wire rod. After air drying at ambient temperature, the panel is placed in a cold oven and heated to 125° C. (about 15 minutes to heat up, then 45 minutes at 125° C.). The panel is removed and air cooled (about 0.4 mil coating). A second application is applied using a similar procedure to increase the coating thickness. Results are given in Table I.

Comparative Example 1

(Not an Example of the Invention)

The following formulation is prepared in a 10 mL bottle. Each component is added in the order given below. This comparative example contains no polymeric polycarboxylate and uses additional β-CEA Terpolymer to balance the reactants' stoichiometry.

| Coating Formulation | | |
|---|---|---|
| β-CEA Terpolymer | 2.65 g | 1.50 meq $CO_2^\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | <1 g | |
| FC-129 (1% in water) | 0.22 g | |
| Ethylene Glycol | 1.10 g | |

A coating is prepared using the identical procedure used in Example 4. Results are given in Table I.

EXAMPLE 5

A polymeric polycarboxylate is prepared as follows:
Preparation of a polymeric polycarboxylate Based on Jeffamine™ D-400 and Sebacic Acid; Acid:Amine Molar Ratio=1.33; Molecular Weight=1866.

Jeffamine™ D-400 (206.76 g, 0.4528 mol, MW=456.6) and sebacic acid (122.11 g; 0.6038 mol) are combined in the same reaction set-up used in the preparation of Starting Material C. The system is flushed with $N_2$ and maintained under an $N_2$ blanket. The contents of the reactor are heated to 150° C. at atmospheric pressure to form the corresponding amine salt. The system is then evacuated to 2 mm Hg and maintained at this reduced pressure and 150° C. for 5 hours while the by-product water from amide formation is collected in the −78° C. trap. After cooling to ambient temperature under $N_2$, the crude product is dissolved in methanol (200 mL) and stirred overnight with Dowex™ 50W ion exchange resin to adsorb any amino compounds. The methanol solution is then filtered to remove resin beads and stripped on a rotary evaporator to remove the methanol. The product is obtained as a viscous, amber liquid: 1.075 meq/g by titration with 0.1000N NaOH; molecular weight is 1866 by end group titration (5.9 amide moieties/average molecule). Carbon-13 NMR ($CDCl_3$) shows amide moieties and carboxylic acid moieties.

A portion of the above product is neutralized with ammonium hydroxide to a pH of about 9 and additional water is added to give the corresponding ammonium salt at about 10 percent solids. Carbon-13 NMR (DMSO-$d_6$) shows amide carbonyl moieties and carboxylate anion carbonyl moieties.

The following formulation is prepared in a 10 mL bottle. The IPO Polymer is prepared as in Starting Material D. The β-CEA terpolymer is prepared as described in Example 4. Each component is added in the order given below.

| Coating Formulation | | |
| --- | --- | --- |
| Polymeric Polycarboxylate | 0.62 g | 0.25 meq $CO_2{}^\ominus$ |
| β-CEA Terpolymer | 2.21 g | 1.25 meq $CO_2{}^\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.20 g | |
| Ethylene Glycol | 1.10 g | |

A coating is prepared using the identical procedure used in Example 4. Results are given in Table I.

EXAMPLE 6

A polymeric polycarboxylate is prepared as follows: Preparation of a Polymeric Polycarboxylate Based on Jeffamine™ D-400 and Adipic Acid; Acid:Amine Molar Ratio=1.33; Molecular Weight=2199.

Jeffamine™ D-400 (211.95 g, 0.4642 mol, MW=456.6, an aminated poly(propylene glycol) manufactured by Texaco) and adipic acid (90.45 g; 0.6189 mol) are combined in the same reaction set-up used in the preparation of Starting Material C. The system is flushed with $N_2$ and maintained under an $N_2$ blanket. The contents of the reactor are heated to 150° C. at atmospheric pressure to form the corresponding amine salt. The system is then evacuated to 2 mm Hg and maintained at this reduced pressure and 150° C. for 5 hours while the by-product water from amide formation is collected in the −78° C. trap. After cooling to ambient temperature under N2, the crude product is dissolved in methanol (200 mL) and stirred overnight with Dowex™ 50W ion exchange resin to adsorb any amino compounds. The methanol solution is then filtered to remove resin beads and stripped on a rotary evaporator to remove the methanol. The product is obtained as a viscous, amber liquid: Brookfield viscosity, 614,000 cps at 22° C.; 0.9094 meq/g by titration with 0.1000N NaOH; molecular weight is 2199 by end group titration (8.0 amide moieties/average molecule). Carbon-13 NMR ($CDCl_3$) shows amide moieties and carboxylic acid moieties.

A portion of the above product is neutralized with ammonium hydroxide to pH of about 9 and additional water is added to give the corresponding ammonium salt at about 15 percent solids. Carbon-13 NMR (DMSO-$d_6$) shows amide carbonyl moieties and carboxylate anion carbonyl moieties.

The following formulation is prepared in a 10 mL bottle. The IPO Polymer is prepared as in Starting Material D. The β-CEA terpolymer is prepared as described in Example 4. Each component is added in the order given below.

| Coating Formulation | | |
| --- | --- | --- |
| Polymeric Polycarboxylate | 0.52 g | 0.25 meq $CO_2{}^\ominus$ |
| β-CEA Terpolymer | 2.21 g | 1.25 meq $CO_2{}^\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.20 g | |
| Ethylene Glycol | 1.10 g | |

A coating is prepared using the identical procedure used in Example 4. Results are given in Table I.

EXAMPLE 7

A polymeric polycarboxylate is prepared as follows: Preparation of a Polymeric Polycarboxylate Based on Jeffamine™ D-400 and Succinic Anhydride; Molecular Weight=687.

Jeffamine™ D-400 (201.52 g; 0.4413 mol, MW=456.6), succinic anhydride (88.33 g; 0.8827 mol) and triethylamine (2.90 g) are combined in a 500 mL, 3-necked round-bottomed flask equipped with a temperature controller, overhead stirrer, thermometer and a condenser. The system is flushed with $N_2$ and maintained under an $N_2$ blanket. The contents of the reactor are heated slowly to 50° C. to 55° C., at which time the reaction becomes exothermic. An ice water cooling bath is used to maintain the reactor temperature at 70° C. to 80° C. After the exotherm subsides, the reactor is maintained at 80° C. for 6 hours. After cooling to ambient temperature under $N_2$, the product is obtained as a viscous, amber liquid: 2.912 meq/g by titration with 0.1000N NaOH; molecular weight is 687 by end group titration. Carbon-13 NMR ($CDCl_3$) shows amide moieties and carboxylic acid moieties.

A portion of the above product is neutralized with ammonium hydroxide to a pH of about 9 and additional water is added to give the corresponding ammonium salt at about 15 percent solids.

The following formulation is prepared in a 10 mL bottle. The IPO Polymer is prepared as in Starting Material D. The β-CEA terpolymer is prepared as described in Example 4. Each component is added in the order given below. FC-129 is a fluorochemical surfactant available as Fluororad™ FC-129 from 3M.

| Coating Formulation | | |
| --- | --- | --- |
| Polymeric Polycarboxylate | 0.16 g | 0.25 meq $CO_2{}^\ominus$ |
| β-CEA Terpolymer | 2.21 g | 1.25 meq $CO_2{}^\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.16 g | |
| Ethylene Glycol | 1.10 g | |

A coating is prepared using the identical procedure used in Example 4. Results are given in Table I.

EXAMPLE 8

A polymeric polycarboxylate is prepared as follows:
Preparation of a Polymeric Polycarboxylate Based on Jeffamine™ T-403 and Succinic Anhydride; Equivalent Weight=259.

Jeffamine™ T-403 (164.86 g, 0.3556 mol, MW=463.6), succinic anhydride (106.76 g; 1.0668 mol) and triethylamine (2.72 g, ) are combined in the same equipment used in Example 7. The system is flushed with $N_2$ and maintained under an $N_2$ blanket. The contents of the reactor are heated slowly to a temperature of from 50° C. to 55° C., at which time the reaction becomes exothermic. An ice water cooling bath is used to maintain the reactor temperature at 70° C. to 80° C. After the exotherm subsides, the reactor is maintained at 80° C. for 6 hours. After cooling to ambient temperature under $N_2$, the product is obtained as a viscous, amber liquid: Brookfield viscosity, >2,000,000 cps at 24° C.; 3.86 meq/g by titration with 0.1000N NaOH; equivalent weight is 259 by end group titration. Carbon-13 NMR ($CDCl_3$) shows amide moieties and carboxylic acid moieties.

A portion of the product from Example 8 is neutralized with ammonium hydroxide to about pH 9 and additional water is added to give the corresponding ammonium salt at about 10 percent solids. Carbon-13 NMR (DMSO-$d_6$) shows amide carbonyl moieties and carboxylate anion carbonyl moieties.

The following formulation is prepared in a 10 mL bottle. The IPO Polymer is prepared as in Starting Material D. The β-CEA terpolymer is prepared as described in Example 4. Each component is added in the order given below.

| Coating Formulation | | |
|---|---|---|
| Polymeric Polycarboxylate | 0.16 g | 0.25 meq $CO_2\ominus$ |
| β-CEA Terpolymer | 2.21 g | 1.25 meq $CO_2\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.16 g | |
| Ethylene Glycol | 1.10 g | |

A coating is prepared using the identical procedure used in Example 4. Results are given in Table I.

EXAMPLE 9

A polymeric polycarboxylate is prepared as follows:
Preparation of a Polymeric Polycarboxylate Based on Jeffamine™ D-2000 and Succinic Anhydride; Equivalent Weight=918.

Jeffamine™ D-2000 (297.81 g, 0.1495 mol, MW=1991.5), succinic anhydride (29.93 g; 0.2991 mol) and triethylamine (3.28 g) are combined in the same equipment used in Example 7. The system is flushed with $N_2$ and maintained under an $N_2$ blanket. The contents of the reactor are heated slowly to a temperature of about 50° C. to 55° C., at which time the reaction becomes exothermic. An ice-water cooling bath is used to maintain the reactor temperature at 70° C. to 80° C. After the exotherm subsides, the reactor is maintained at 80° C. for 6 hours. After cooling to ambient temperature under $N_2$, the product is obtained as a viscous, amber liquid: Brookfield viscosity, 7,890 cps at 24° C.; 1.09 meq/g by titration with 0.1000N NaOH; molecular weight is 1837 by end group titration. Carbon-13 NMR ($CDCl_3$) shows amide moieties and carboxylic acid moieties.

A portion of the above product is neutralized with ammonium hydroxide to a pH of about 9 and additional water is added to give the corresponding ammonium salt at about 15 percent solids.

The following formulation is prepared in a 10 mL bottle. The IPO Polymer is prepared as in Starting Material D. The β-CEA terpolymer is prepared as described in Example 4. Each component is added in the order given below.

| Coating Formulation | | |
|---|---|---|
| Polymeric Polycarboxylate | 1.03 g | 0.25 meq $CO_2\ominus$ |
| β-CEA Terpolymer | 2.21 g | 1.25 meq $CO_2\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.20 g | |
| Ethylene Glycol | 1.10 g | |

A coating is prepared using the identical procedure used in Example 4. Results are given in Table I.

EXAMPLE 10

A methacrylate terpolymer is prepared as described above for Starting Material A. The following formulation is prepared in a 10 mL bottle. The polymeric polycarboxylate is prepared as in Example 7. The IPO Polymer is prepared as described above for the preparation of Starting Material D. Each component is added in the order given below.

| Coating Formulation | | |
|---|---|---|
| Polymeric Polycarboxylate | 0.16 g | 0.25 meq $CO_2\ominus$ |
| Methacrylate Terpolymer | 2.47 g | 1.26 meq $CO_2\ominus$ |
| 15 N $NH_4OH$ | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.20 g | |
| Ethylene Glycol | 1.10 g | |

A coating is prepared using the identical procedure used in Example 4. Results are given in Table I.

Comparative Example 2

(Not an Example of this Invention)

The following formulation is prepared in a 10 mL bottle. Each component is added in the order given below. This comparative example contains no polymeric polycarboxylate and uses additional methacrylate terpolymer (Starting Material A) to balance the reactants stoichiometry.

| Coating Formulation | | |
|---|---|---|
| Methacrylate Terpolymer | 2.94 g | 1.50 meq $CO_2\ominus$ |

| Coating Formulation | | |
|---|---|---|
| 15 N NH₄OH | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.22 g | |
| Ethylene Glycol | 1.10 g | |

A coating is prepared using the identical procedure used in Example 4. Results are given in Table I.

EXAMPLE 11

The following formulation is prepared in a 10 mL bottle. The polymeric polycarboxylate is prepared as in Example 8. The methacrylate terpolymer is prepared using the procedure described above for the preparation of Starting Material A. The IPO Polymer is prepared as described above for the preparation of Starting Material D. Each component is added in the order given below.

| Coating Formulation | | |
|---|---|---|
| Polymeric polycarboxylate | 0.16 g | 0.25 meq $CO_2^\ominus$ |
| Methacrylate Terpolymer | 2.47 g | 1.26 meq $CO_2^\ominus$ |
| 15 N NH₄OH | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.20 g | |
| Ethylene Glycol | 1.10 g | |

A coating is prepared using the identical procedure used in Example 4. Results are given in Table I.

EXAMPLE 12

Preparation of Methacrylate Terpolymer 2 (MMA 2)

| Component | mol % | wt % | Parts |
|---|---|---|---|
| Methacrylic Acid | 17.4 | 10 | 10.0 |
| Methyl Methacrylate | 64.7 | 60 | 60.0 |
| N-Butyl Methacrylate | 22.8 | 30 | 30.0 |
| VAZO 64 (1.5 g in 10 ml MEK) | | | 11.5 |
| Tertiary Butanol | | | 100.0 |

A methacrylate terpolymer (MMA 2) is prepared from the above components using the procedure described above for the preparation of Starting Material A. An aqueous polymer solution is prepared containing 11.0 percent solids (87.3 g) polymer.

The following coating formulation is prepared in a 10 mL bottle. The polymeric polycarboxylate is prepared as in Example 7. The IPO Polymer is prepared using the procedure described above for the preparation of Starting Material D. Each component is added in the order given below.

| Coating Formulation | | |
|---|---|---|
| Polymeric Polycarboxylate | 0.16 g | 0.25 meq $CO_2^\ominus$ |
| MMA 2 | 8.28 g | 1.25 meq $CO_2^\ominus$ |
| 15 N NH₄OH | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.20 g | |
| Ethylene Glycol | 1.10 g | |

A coating is prepared using the identical procedure used in Example 4. Results are given in Table I.

Comparative Example 3

(Not an Example of the Invention)

The following formulation is prepared in a 10 mL bottle. Each component is added in the order given below. This comparative example contains no polymeric polycarboxylate and uses additional MMA 2 to balance the reactants stoichiometry.

| Coating Formulation | | |
|---|---|---|
| MMA 2 | 9.94 g | 1.50 meq $CO_2^\ominus$ |
| 15 N NH₄OH | 0.10 g | |
| i-Propanol | 0.50 g | |
| IPO Polymer | 1.89 g | 1.50 meq oxazoline |
| i-Propanol to clear | <1.0 g | |
| FC-129 (1% in water) | 0.22 g | |
| Ethylene Glycol | 1.10 g | |

A coating is prepared using the identical procedure used in Example 4. Results are given in Table I.

EXAMPLE 13

The following formulation is prepared in a 10 mL bottle. The polymeric polycarboxylate is prepared as in Example 5. The methacrylate terpolymer 2 (MMA 2) is prepared as in Example 12. The IPO Polymer is prepared as described above for the preparation of Starting Material D. Each component is added in the order given below.

| Coating Formulation | | |
|---|---|---|
| Polymeric Polycarboxylate | 1.24 g | 0.50 meq $CO_2^\ominus$ |
| MMA 2 Terpolymer | 16.44 g | 2.50 meq $CO_2^\ominus$ |
| 15 N NH₄OH | 0.20 g | |
| i-Propanol | 1.00 g | |
| IPO Polymer | 3.97 g | 3.15 meq oxazoline |
| i-Propanol to clear | <1.0 g | |
| FC-129 (1% in water) | 0.20 g | |
| Ethylene Glycol | 2.20 g | |

A coating is prepared using the identical procedure used in Example 4, except three cure schedules are used: (a) 1 hour at 125° C., (b) 1 hour at 100° C. and (c) 30 minutes at 85° C. Results are given in Table I.

TABLE I

Test Results of Coated Panels

| Example | Polymeric Polycarboxylate | Polymer | Number of Coatings | Results | Knoop Hardness |
|---|---|---|---|---|---|
| 4 | yes | β-CEA terpolymer | 2 | Hazy, softened by water, NH$_4$OH, i-propanol | nm |
| Comp 1 | none | β-CEA terpolymer | 1 | Poor coating, brittle, cracked, no adhesion | |
| 5 | yes | β-CEA terpolymer | 2 | Hazy, softened by water, NH$_4$OH, i-propanol | nm |
| 6 | yes | β-CEA terpolymer | 2 | Hazy, softened by water, NH$_4$OH, i-propanol | nm |
| 7 | yes | β-CEA terpolymer | 4 | Clear, impervious to water, NH$_4$OH, i-propanol | 34.2 |
| 8 | yes | β-CEA terpolymer | 4 | Clear, impervious to water, NH$_4$OH, i-propanol | 34.2 |
| 9 | yes | β-CEA terpolymer | 2 | Hazy, softened by water, NH$_4$OH, i-propanol | nm |
| 10 | yes | Starting Mat'l A | 4 | Clear, tough, impervious to water and i-propanol; softened by NH$_4$OH | 31.5 |
| Comp 2 | none | Starting Mat'l A | 1 | Poor coating, brittle, cracked, no adhesion | |
| 11 | yes | Starting Mat'l A | 4 | Some haziness, impervious to water and i-propanol; softened by NH$_4$OH | 34.5 |
| 12 | yes | MMA 2 | 3 | Clear, tough, impervious to water and i-propanol; softened by NH$_4$OH | 27.4 |
| Comp 3 | none | MMA 2 | 1 | Poor coating, brittle, cracked, no adhesion | |
| 13(a) | yes | MMA 2 | 1 | Clear, tough, impervious to water and i-propanol; softened by NH$_4$OH | 38.4 |
| 13(b) | yes | MMA 2 | 1 | Clear, tough, impervious to water and i-propanol; softened by NH$_4$OH | 36.4 |
| 13(c) | yes | MMA 2 | 1 | Clear, tough, impervious to water and i-propanol; softened by NH$_4$OH | 26.9 | nm = not measured; (a) = cured 1 hr/125° C.; (b) = cured 1 hr/100° C.; (c) = cured 30 min/85° C.

In Table 1, all three comparative examples are made without using Polymeric Polycarboxylates in the formulations based on either the β-CEA terpolymer or the methyl methacrylate terpolymer systems. In all cases the coatings are very poor-brittle, cracked, no adhesion. By contrast, all coatings in which a carboxylic acid functional polyamide is included in the formulation show improved physical properties. Coatings based on polymeric polycarboxylates described in Examples 7 and 8 gave coatings with especially good performance-clear, hard coatings impervious to water, NH$_4$OH and isopropanol. Example 13(c) indicates that useful coatings can be obtained using cures as low as 85° C. for 30 minutes.

EXAMPLE 14

The following formulation is prepared in a 10 mL bottle. The polymeric polycarboxylate is prepared as in Example 6. The IPO Polymer is prepared as described above for the preparation of Starting Material D. The β-CEA terpolymer is prepared as described above for the preparation of Example 4. Each component is added in the order given below.

| Coating Formulation | | |
|---|---|---|
| Polymeric Polycarboxylate | 0.0079 g | 0.00282 meq CO$_2^\ominus$ |
| β-CEA Terpolymer | 0.2000 g | 0.02819 meq CO$_2^\ominus$ |
| 15 N NH$_4$OH | 0.02 g | |
| i-Propanol | 0.0475 g | |
| IPO Polymer | 0.0751 g | 0.03382 meq oxazoline |

The formulation is cast on an untreated glass slide and cured for 1 hour at 125° C. The resulting film is clear, colorless, smooth and homogeneous and is resistant to hexane, isopropanol and water. The film is hard and resisted being scratched by a #6H pencil.

EXAMPLE 15

Coating Containing Purified Polymeric Polycarboxylate

The Polymeric Polycarboxylate used in Example 14 is purified by dissolving in ammonium hydroxide solution and washing with ethyl acetate (a little toluene is added to facilitate phase separation). The aqueous phase is acidified with hydrochloric acid solution (2 percent) and the polymeric polycarboxylate is allowed to separate out. The water is removed and the polymeric polycarboxylate is dissolved in ethyl acetate. The organic phase is washed with water (salt needed to break up emulsion), dried with anhydrous $Na_2SO_4$ and concentrated in vacuum. This purified material is used in the same formulation as used in Example 14. The films on glass are cured as above. They are clear, colorless, smooth, homogeneous and have a somewhat better appearance than the coatings made in Example 14; pencil hardness is #6H.

EXAMPLE 16

Preparation of a Coated Floor Tile

An additional quantity of the formulation used in Example 15 is prepared. A piece of Armstrong floor tile is cleaned with soapy water and rinsed with isopropanol. A thick coating (No. 40 wire rod) is applied and cured at 105° C. for 1 hour. A clear, tough, adherent, flexible coating is obtained.

What is claimed is:

1. A composition comprising at least 10 percent by weight of water and, based on the weight of components (a), (b), and (c);
   (a) 0 to about 95 percent by weight of a water-compatible polymer having at least two pendant carboxylate groups;
   (b) 1 to about 60 percent by weight of a polymeric polycarboxylate different from component (a) which has (1) at least two pendant carboxylate groups and (2) at least one internal amide, thioamide, urea, thiourea, biuret, dithiobiuret, or urethane group; and
   (c) 2 to about 70 percent by weight of a polyfunctional crosslinking agent having ionic or potentially ionic moeity counter ions capable of reacting with the carboxylate groups of (a) and (b).

2. The composition of claim 1 wherein component (a) is present in an amount, based on the weight of components (a), (b), and (c), of at least about 10 percent.

3. The composition of claim 1 wherein component (a) is present in an amount, based on the weight of components (a), (b), and (c), of no greater than about 70 percent.

4. The composition of claim 1 wherein component (b) contains at least one internal amide group.

5. The composition of claim 1 wherein component (b) is present in an amount, based on the weight of components (a), (b), and (c), of at least about 1 percent.

6. The composition of claim 1 wherein component (b) is present in an amount, based on the weight of components (a), (b), and (c), of at least about 5 percent.

7. The composition of claim 1 wherein component (c) is present in an amount, based on the weight of components (a), (b), and (c), of at least about 1 percent.

8. The composition of claim 1 wherein component (b) is present in an amount, based on the weight of components (a), (b), and (c), of at least about 20 percent.

9. The composition of claim 1 wherein component (a) contains at least one pendant fluoroalkyl moiety.

10. The composition of claim 9 wherein the fluroalkyl moiety is a $C_6$-$C_9$ fluoroaliphatic group containing at least three fully fluorinated carbon atoms, including a terminal —$CF_3$ group.

11. The composition of claim 9 wherein component (a) is present in an amount, based on the weight of components (a), (b), and (c), of at least about 10 percent.

12. The composition of claim 9 wherein component (a) is present in an amount, based on the weight of components (a), (b), and (c), of no greater than about 90 percent.

13. The composition of claim 9 wherein component (b) contains at least one internal amide group per molecule.

14. The composition of claim 9 wherein component (b) contains at least two internal amide groups per molecule.

15. The composition of claim 9 wherein component (b) is present in an amount, based on the weight of components (a), (b), and (c), of at least about 5 percent.

16. The composition of claim 9 wherein component (c) is present in an amount, based on the weight of components (a), (b), and (c), of at least about 10 percent.

17. The composition of claim 9 wherein component (c) is present in an amount, based on the weight of components (a), (b), and (c), of at least about 20 percent.

18. The composition of claim 1 wherein component (c) is poly-(2-isopropenyl-2-oxazoline).

19. The composition of claim 1 wherein component (c) is a copolymer of 2-isopropenyl-2-oxazoline and methyl methacrylate.

20. The composition of claim 1 wherein component (b) is the salt form of the reaction product of a $C_{2-8}$ aliphatic dicarboxylic acid and a polyalkyleneoxy polyamine, which reaction product has a molecular weight in the range of from about 300 to about 5,000.

* * * * *